United States Patent [19]

Hough

[11] Patent Number: 4,666,206

[45] Date of Patent: May 19, 1987

[54] SUNROOF FRAME ASSEMBLY FOR VEHICLES

[75] Inventor: Louis E. Hough, St. Clair Shores, Mich.

[73] Assignee: Empire Automotive, Inc., Detroit, Mich.

[21] Appl. No.: 699,093

[22] Filed: Feb. 7, 1985

[51] Int. Cl.$^4$ .......................... B60J 7/195; E06B 7/16
[52] U.S. Cl. .................... 296/216; 296/218; 49/485; 49/493
[58] Field of Search ............... 296/215, 216, 217, 218, 296/219, 224; 49/504, 485, 493

[56] References Cited

U.S. PATENT DOCUMENTS 4,127,302 11/1978 Green .................................. 296/218

FOREIGN PATENT DOCUMENTS

| 0059859 | 9/1982 | European Pat. Off. ............ 296/224 |
| 3241652 | 5/1984 | Fed. Rep. of Germany ...... 296/218 |
| 316014 | 3/1934 | Italy .................................... 296/224 |
| 2103278 | 2/1983 | United Kingdom ................ 296/218 |

Primary Examiner—Robert B. Reeves
Assistant Examiner—Dennis H. Pedder
Attorney, Agent, or Firm—Cullen, Sloman, Cantor, Grauer, Scott & Rutherford

[57] ABSTRACT

A frame assembly for mounting a sunroof panel in the roof of a vehicle includes top and bottom frame portions respectively disposed above and below the roof and which secured together with the roof tightly sandwiched therebetween. The bottom frame portion includes a lateral channel-like extension for supporting a weatherstrip which engages and supports the sunroof panel. The top and bottom frame portions include a first set of opposing flanges between which the vehicle's roof is tightly sandwiched and a second set of opposing flanges between which a portion of the weatherstrip is trapped, thereby mounting the weatherstrip on the frame and creating a positive seal around the entire perimeter of the frame which prevents moisture from entering the vehicle between the weatherstrip and the frame. The frame portions are drawn together against the roof by screws extending through the bottom frame portion into a continuous rib in the top frame portion which is received within a channel in the bottom frame portion. The frame portions particularly simple in geometry and may be manufactured by die casting or molding techniques.

18 Claims, 4 Drawing Figures

U.S. Patent  May 19, 1987  4,666,206
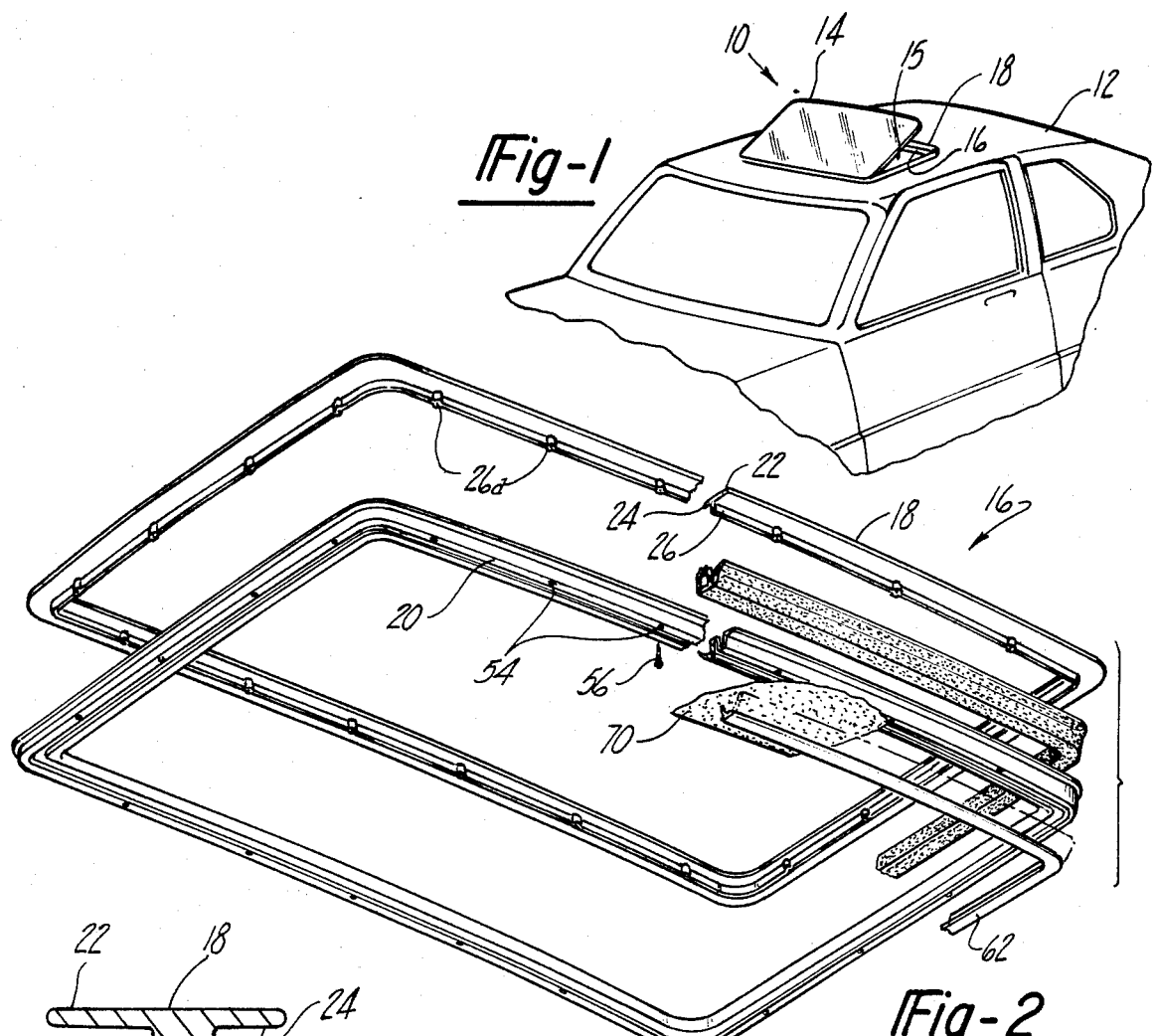
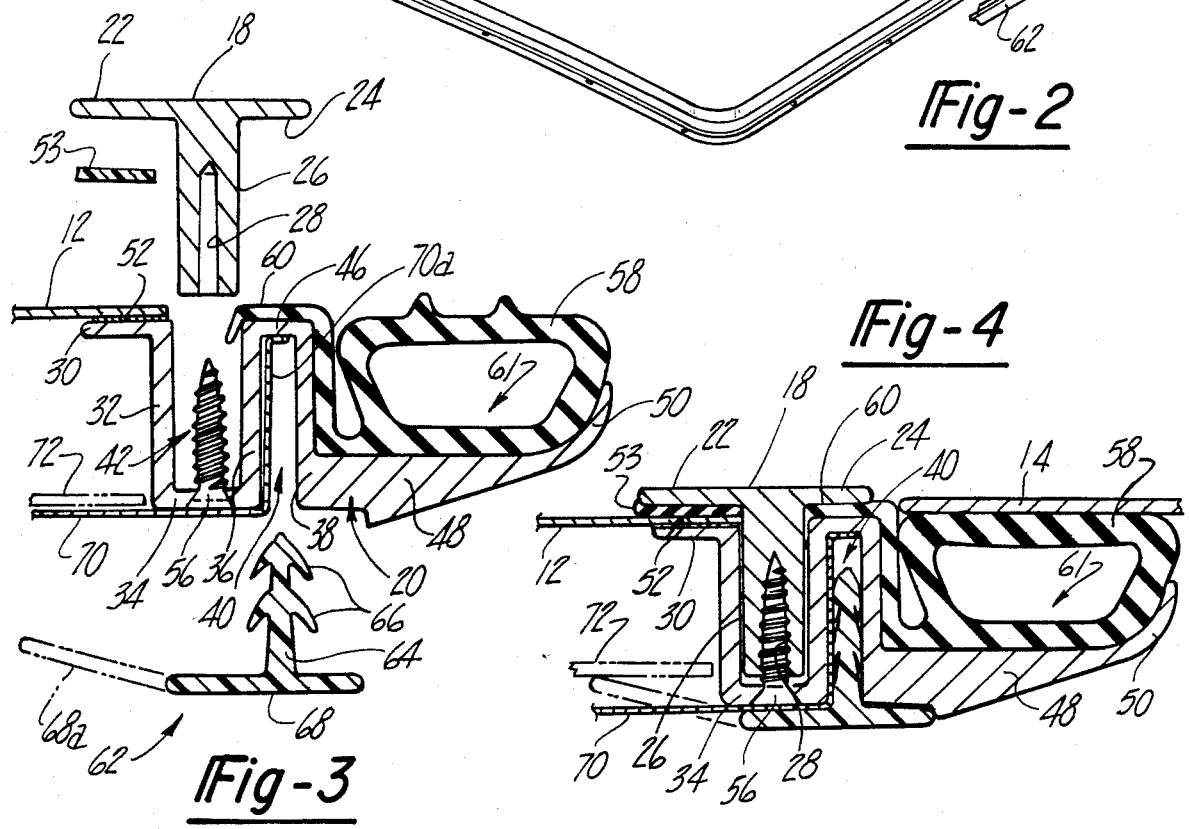

SUNROOF FRAME ASSEMBLY FOR VEHICLES

TECHNICAL FIELD

The present invention broadly relates to hatches or sunroofs installed in the roof of a vehicle, and deals more particularly with an improved sunroof frame assembly for mounting and supporting a sunroof closure panel.

BACKGROUND ART

One type of sunroof assembly that has gained popularity and widespread use in recent years includes a manually operable sunroof panel which is mounted by hinges or latches on a frame that can be easily installed in the vehicle's roof either at the factory at the time the vehicle is manufactured, or at a later point in time as a retrofit to the vehicle.

The frames used in the sunroof assemblies of the type described above normally employ a primary frame section which overlies the upper surface of the roof and which includes a peripheral flange for supporting the sunroof panel. A weatherstrip mounted in a channel formed on the flange engages the panel and is intended to prevent the entry of moisture into the vehicle between the panel and the surrounding frame. In some cases, the weatherstrip is held in place on the flange by means of a suitable adhesive. In other designs, the weatherstrip mounting consists of an interlocking connection between the weatherstrip and the frame; a portion of the weatherstrip is held within specially configured ways defined by undercuts in the frame.

Neither of these prior art techniques of mounting the weatherstrip on the frame is totally effective in sealing the sunroof assembly against moisture penetration. Adhesives sometimes harden and crack or otherwise deteriorate, thus allowing entry of moisture. Mechancial interlocks require tolerances between the weatherstrip and the frame undercuts which create a path for the entry of moisture. The possibility of moisture entry in prior art sunroof assemblies is further increased due to the fact that the weatherstrip is not positively pressed against the frame to create a positive seal therebetween.

The prior art frames are rather complex in configuration for several reasons, including the need for providing undercuts therein which are used for mounting the weatherstrip, and the need for providing a cavity into which the edges of the interior headliner may be tucked in order to provide a finished appearance inside the vehicle. As a result of the relative complexity of frame geometry, particularly in cross-section, known prior art frames are normally manufactured by extrusion techniques. This manufacturing method is rather expensive on a piece part basis because a multiplicity of processing steps are required, including the step of making the initial extrusion, welding the ends of the extrusion together to form the frame, drilling the frame, hand finishing the extrusion, etc.

Consequently, there is a need in the art for a sunroof frame assembly which is particularly simple in design in order to reduce manufacturing costs, and which also provides an improved arrangement for mounting the weatherstrip in a manner which creates a positive, weather-tight seal. The present invention satisfies these objectives.

SUMMARY OF THE INVENTION

According to the present invention, an improved frame assembly is provided for use with sunroofs, comprising top and bottom frame portions which are drawn against each other, and against the sheet metal roof of the vehicle by screws which interconnect the frame portions. The frame portions include a first set of outer flanges between which an edge of the roof panel is sandwiched, and a second set of inner flanges between which a portion of the weatherstrip is tightly trapped under pressure, thereby mounting the weatherstrip while at the same time assuring a weather-tight seal. The weatherstrip is supported by a channel-like lateral extension formed integral with the bottom frame portion. A second channel in the bottom frame portion matingly receives a continuous, downwardly projecting rib in the top frame portion. A third channel in the bottom frame portion provides a cavity into which the edges of the vehicle's interior headliner may be tucked in order to provide a finished appearance for the vehicle's interior. In those vehicles having a rigid type of headliner, a trim lace is provided which is received within the third channel and overlies the raw edge of the headliner to provide a finished appearance. As a result of the relatively simple geometry of the top and bottom frame portions, each may be manufactured as unitary units by simple molding or die casting techniques. Moreover, the frame assembly is particularly simple to install in the vehicle's roof and may be used in connection with virtually any type of hinges, latches and hardware employed to mount the panel in the frame.

BRIEF DESCRIPTION OF THE DRAWINGS

In the drawings, which form an integral part of the specification and are to be read in conjunction therewith, and in which like reference numerals are employed to designate identical components in the various views:

FIG. 1 is a fragmentary, perspective view of a portion of a vehicle having a sunroof installed therein which employs the frame assembly of the present invention;

FIG. 2 is an exploded, bottom perspective view of the frame assembly of the present invention;

FIG. 3 is a partially exploded, cross-sectional view taken through the roof and frame assembly shown in FIG. 1; and, FIG. 4, is a view similar to FIG. 3 but showing the upper and lower frame portions in their assembled positions in the roof.

DETAILED DESCRIPTION OF A PREFERRED EMBODIMENT

Referring to FIGS. 1-4, the present invention is generally concerned with an improved frame assembly generally indicated at 16 which forms a portion of a sunroof 10 that includes a sunroof panel 14 mounted within an opening 15 in the roof 12 of a vehicle.

Roof 12 may be made of, as for example, sheet metal. The frame assembly 16 broadly includes top and bottom, rectangularly shaped frame portions 18, 20 both of which extend completely around the perimeter of opening 15 and a weatherstrip 58. The panel 14 may be mounted on the frame assembly 16 using various types of conventional hinges and latch assemblies (not shown) which are well known in the art and therefore need not be described in detail herein. However, these mounting assemblies will be connected to the bottom frame portion 20, normally along the front and rear edges thereof.

The bottom frame portion 20 includes a first upwardly opening, U-shaped channel 42 defined by a base or bight 34 and a pair of upwardly extending legs or walls 32, 36. Outer and inner, substantially co-planar flanges 30, 46 respectively extend outwardly from the top of the associated walls, 32, 36 and are disposed in a plane immediately below the roof panel 12. The outer flange 30 bears against the bottom surface of the roof panel 12. A layer 52 of suitable inert material can be interposed between the flange 30 and roof 12 to prevent galvanic reaction where the materials of the roof panel 12 and flange 30 are dissimilar and may react with each other. The base 34 of the channel 42 includes a plurality of spaced apart through holes 54 therein for receiving later described screws 56 which extend into the channel opening 42 and function to secure together the top and bottom frame portions 18, 20.

The bottom frame portion 20 further includes a lateral extension 61 for supporting the panel 14, which comprises a substantially vertical sidewall 38 connected to the flange 46, a generally horizontal base 48 and an upwardly turned lip 50 which collectively define a channel like support on which the weatherstrip 58 is mounted.

Lateral extension 61 extends into the opening 15. The weatherstrip 58 is formed of any suitable synthetic or rubber material which is resiliently deformable, and includes an edge 60 which overlies flange 46. As best seen in FIG. 3, the vertical sidewall 38 in combination with the wall 36 and flange 46 define a downwardly opening, U-shaped channel 40 which is positioned between channel 42 and the lateral extension 61.

The top frame portion 18 includes an outer flange 22 and an inner flange 24 which lie in a common plane and respectively oppose the outer and inner flanges 30, 46 of the lower frame portion 20. The outer flange 22 bears against the roof panel 12 through a weather tight seal or gasket 53 formed of a closed cell foam tape, a mastic or RTV silicone. A centrally disposed, continuous rib 26 extends downwardly from the flanges 22, 24 and is received within the U-shaped channel 42 of the bottom frame portion 20. The rib 26 is provided with a plurality of enlarged bosses 26a spaced along its length. Bosses 26a include longitudinal holes 28 for threadably receiving the screws 56.

As best seen in FIG. 2, the frame portions 18, 20 are particularly simple in geometry: the top frame portion 18 is essentially T-shaped in cross-section while the bottom frame portion 20 consists of a series of U-shaped channels, the individual components of which extend substantially perpendicular to each other and do not include any undercuts as are often employed by prior art frame constructions. Consequently, both the top and bottom frame portions 18, 20 may be manufactured as unitary units in a single operation as by molding or die casting a suitable metal alloy or reinforced plastic. The various channel openings, and apertures (28, 54) for the screws 56 are integrally formed in the frame during this single casting step. Accordingly, the frame assembly 16 of the present invention is exceptionally economical to manufacture, and, as will become apparent hereinafter, the frame assembly 16 is especially simple to install and is highly effective in providing a permanent weather-tight seal in the vehicle's roof 12.

After the opening 15 is formed in the vehicle roof 12, the bottom frame portion 20 is positioned beneath the roof panel 12 with the gasket 52 sandwiched between the roof panel 12 and the outer flange 30. The weatherstrip 58 is then placed in the channel-like lateral extension 61 with the weatherstrip edge 60 overlying the inner flange 46. The top frame portion is then installed by inserting the rib 26 into the channel opening 42, following which the screws 56 are inserted from the bottom of the frame assembly 16, through the apertures 54 and into the rib holes 28. As the screws 56 are tightened, the top and bottom frame portions 18, 20 are drawn toward each other such that the roof panel 12 is tightly sandwiched by positive pressure between the outer flanges 22, 30, while the weatherstrip edge 60 is likewise tightly sandwiched between the inner flanges 24, 46. The constant, positive pressure exerted by the opposing sets of flanges 22, 30 and 24, 46 forms a weather-tight seal between the frame assembly 16, the roof panel 12 and weatherstrip 58. With the frame assembly 16 thus installed, the peripheral edge 70a of the vehicles' flexible headliner 70 is tucked into the channel opening 40 following which a flexible trim lace 62, preferably formed of plastic, is installed to complete the installation. The trim lace 62 includes a rib 64 with one or more flexible barbs 66 which are received within the channel opening 40 and bear against the headliner edge 70. The trim lace 62 includes a flat flange 68 which overlies the channel opening 40 to provide a finished appearance at the intersection of the frame assembly 16 and the headliner 70 while also covering and thereby concealing the heads of the screws 56.

In those vehicles employing a rigid headliner 72 rather than the flexible headliner 70, the trim flange 68 may include an angled extension 68a which overlies and engages the headliner 72.

From the foregoing, it is apparent that the sunroof frame assembly described above not only provides for the reliable accomplishment of the objects of the invention but does so in a particularly effective and economical manner. It is recognized, of course, that those skilled in the art may make various modifications or additions to the preferred embodiment chosen to illustrate the invention without departing from the spirit and scope of the present contribution to the art. Accordingly, it is to be understood that the protection sought and to be afforded hereby should be deemed to extend to the subject matter claimed and all equivalents thereof fairly within the scope of the invention.

What is claimed is:

1. A frame assembly for mounting a sunroof panel in an opening of a vehicle's roof, comprising:
    top and bottom frame portions respectively disposed above and below said roof and being secured together with said roof sandwiched therebetween;
    said bottom frame portion including a lateral extension beneath said panel for supporting said panel;
    a deformable weatherstrip on said lateral extension for engaging said panel and forming a weather tight seal between said panel and said frame portions;
    said top and bottom frame portions respectively including first opposing flanges, a portion of said weatherstrip being tightly compressed by said first flanges.

2. The frame assembly of claim 1, wherein said top and bottom frame portions respectively include second opposing flanges and said roof is tightly compressed between said second flanges.

3. The frame assembly of claim 1, wherein said bottom frame portion includes a first channel defined by said lateral extension, a second upwardly opening channel and a third downwardly opening channel, said top frame portion being partially received within said second channel, said third channel being disposed between said first and second channels and adapted to have the edges of a roof headliner secured therewithin.

4. A frame assembly for mounting a sunroof panel in an opening in the roof of a vehicle, comprising:
first and second frame portions extending around the perimeter of said opening, said first frame portion including a first flange bearing against the top of said roof around said opening, said second frame portion including a first flange opposing said first flange of said first frame portion and bearing against the bottom of said roof such that said roof is sandwiched between the first flanges of said first and second frame portions,
said second frame portion including a lateral extension extending into said opening and supporting the edges of said panel;
means for securing together said first and second frame portions; and
a deformable resilient weatherstrip supported on said extension and tightly engaging said panel to create a weathertight seal said first and second frame portions respectively including second opposing flanges between which a portion of said weatherstrip is tightly compressed to form a weathertight seal.

5. The frame assembly of claim 4, wherein said second opposing flanges of said first and second frame portions are substantially planar.

6. The frame assembly of claim 5, wherein said first frame portion is substantially T-shaped in cross-section.

7. The frame assembly of claim 6, wherein said second frame portion includes a U-shaped channel defined by a bight and a pair of legs, said first frame portion being secured within said U-shaped channel.

8. The frame assembly of claim 7, wherein said first frame portion includes a continuous rib extending around said opening and into said channel, said securing means including a plurality of screws extending through said bight and into said rib.

9. A frame assembly for mounting a sunroof panel in an opening in the roof of a vehicle, comprising:
a top frame portion overlying and engaging the top of said roof, said top frame portion including a downwardly extending projection; and
a bottom frame portion underlying and engaging the bottom of said roof, said bottom frame portion including a first channel extending into said opening and disposed underneath said panel and a second, upwardly opening channel;
said projection of said top frame being complementary to and secured to the inside of said second channel;
a deformable weather strip on said first channel for engaging said panel and forming a weather tight seal between said panel and said frame portions;
said top and bottom frame portions respectively including first opposed members, a portion of said weather strip being tightly compressed by said first opposed members; and
means for interconnecting said top and bottom frame portions.

10. The frame assembly of claim 9, wherein said top frame portion includes a rib extending downwardly into said second channel, said rib extending continuously around said opening and said interconnecting means including a plurality of screws extending upwardly through said second channel into said rib.

11. The frame assembly of claim 9, wherein said bottom frame portion includes a third, downwardly opening channel, said frame assembly further including means extending into said third channel adapted to secure the edges of an interior headliner within said third channel.

12. The frame assembly of claim 9, wherein said top and bottom frame portions include a second set of opposed members between which said roof is tightly compressed.

13. A frame assembly for mounting a moveable sunroof panel within a rectangular opening in the roof of a vehicle, said roof including an exterior panel of sheet metal and an interior headliner, comprising:
a unitary, substantially rectangular, top frame portion extending completely around the perimeter of said opening, said top frame portion including
(1) an outer flange overlying and engaging the top of said exterior panel of sheet metal,
(2) an inner flange opposite said outer flange and extending into said opening,
(3) a downwardly extending projection between said inner and outer flanges;
a unitary, substantially rectangular bottom frame portion extending completely around the perimeter of said opening, said bottom frame portion including
(1) a first upward opening, U-shaped channel defined by a bight and a pair of legs,
(2) an outer flange underlying and bearing against the bottom of said roof, said outer flange being connected to one of said legs,
(3) an inner flange extending into said opening and connected to the other of said legs,
(4) a second channel defined by a base extending into said opening and a side wall connecting said base with said inner flange of said bottom frame portion,
(5) said sidewall of said second channel and one leg of said first channel being spaced from each other to define a downwardly extending third channel;
a weatherstrip extending completely around the perimeter of said opening and supported on said base, a portion of said weatherstrip being tightly compressed between the inner flanges of said top and bottom frame portions to form a weather tight seal between said top and bottom frame portion; and,
means for drawing said top and bottom frame portions toward each other and against said roof.

14. The frame assembly of claim 13, wherein said top frame portion is substantially T-shape in cross-section.

15. The frame assembly of claim 13, wherein said inner and outer flanges of said top frame portion are essentially co-planar with each other, and said inner and outer flanges of said bottom frame portion are essentially co-planar with each other.

16. The frame assembly of claim 13, wherein said projection of said top frame portion is defined by a continuous rib extending completely around the perimeter of said opening.

17. The frame assembly of claim 16, wherein said drawing means includes a plurality of fasteners extending through the bight of said first channel and into said rib, said frame assembly further comprising a trim member received within said third channel, said trim member including a flange overlaying and covering the bight, whereby to cover portions of said fasteners from view inside said vehicle.

18. The frame assembly of claim 16, further comprising a trim member received within said third channel, said trim member including a flange overlaying and covering the bight to cover portions of said drawing means from view inside said vehicle.

* * * * *